United States Patent
Bonneric

[15] 3,682,263
[45] Aug. 8, 1972

[54] PROCESS FOR REGULATING INITIAL DOSES FOR THE MAKING UP OF DOSES IN TWO STAGES

[72] Inventor: Francis Bonneric, Fleury Les Aubrais, France

[73] Assignee: Service D'Exploitation Industrielle des Tabacs et des Allumettes, Paris, France

[22] Filed: June 3, 1969

[21] Appl. No.: 830,006

[30] Foreign Application Priority Data

June 7, 1968 France.................68154210

[52] U.S. Cl. ....................177/1, 177/122, 177/157
[51] Int. Cl. ............................................G01g 13/02
[58] Field of Search..............177/122, 154, 155, 157

[56] References Cited

UNITED STATES PATENTS

| | | | |
|---|---|---|---|
| 3,091,301 | 5/1963 | Stone............................ | 177/1 |
| 3,498,395 | 3/1970 | Henry........................... | 177/1 |
| 2,903,230 | 9/1959 | Schachte .............. | 177/122 X |

Primary Examiner—Richard B. Wilkins
Assistant Examiner—George H. Miller, Jr.
Attorney—Seidel and Gonda

[57] ABSTRACT

A process and a device for tobacco packing plants equipped with a weighing unit working on two quick weighing stages, the first one for the weighing of the unit quantities of tobacco and the other one for the delivery of an additional quantity, said process and device allowing to adjust accurately the two weights delivered by a temporary locking of the beam of the balance, so as to damp over thrust occuring in the course of the weighing, especially when the initial quantities delivered are approximately identical to the final ones.

6 Claims, 3 Drawing Figures

A- LOCKED BEAM DURATION
B- BALLAST DURATION
C- VARIATION STAGE
D- CONVEYING OF BALANCE OF DOSE

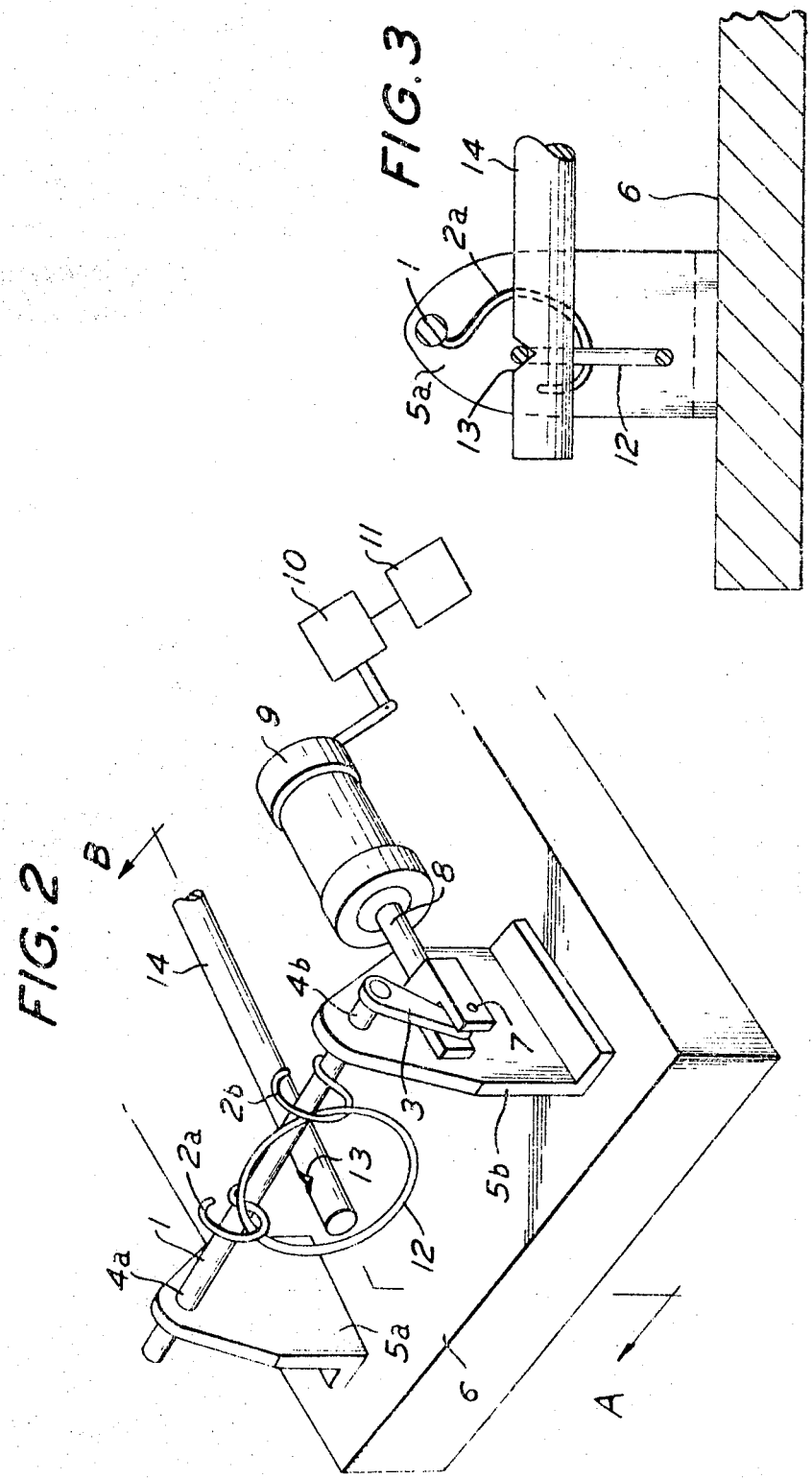

PROCESS FOR REGULATING INITIAL DOSES FOR THE MAKING UP OF DOSES IN TWO STAGES

The packing of bulk material, especially of tobacco, requires special equipments including devices allowing an accurate weighing of the quantities of tobacco to be packed.

Such equipments generally include weighing units used for an accurate weighing of the standard doses of tobacco which are thereafter conveyed towards an overshot belt for packing operations.

The delivery of the doses is most often made in two stages having the same cycle, the first one being used for the carrying-out of an initial dose, the second one for the delivery of an additional dose.

Some of these equipments already include programming devices which use as entry information for the weighing of the initial next dose the valve of the time or of the output equivalent to the delivery of the additional dose, the latter dose being added to the initial one to make the final dose which must be equal to a given standard dose.

However, these devices need special improvements to solve the difficulties encountered particularly in the case of extraneous oscillations of the weighing apparatus, which are all the more a cause of trouble as the machine works at high speeds.

As a matter of fact, whenever the weight of the initial dose is about the same as that of the standard fixed weight, any extraneous oscillation will show that the weighing is completed at the beginning of each cycle; and the risk of such an oscillation is all the more greater as this will be the case.

This will entail two consequences : on the one hand, the conveying of the additionnal dose will be stopped right at the beginning of the cycle, though the standard fixed dose is not yet reached, as a matter of fact; on the other hand, and owing to the fact that the duration of the conveying of the additionnal dose is used as information for the adjustment of the following pre-dose, said next pre-dose will be cut down, as if the initial pre-dose was over the standard dose, whereas it would be desirable, in order to avoid any cumulative disadjustment, to keep unchanged the constituent parts of the pre-dose and particularly the volume thereof.

In other words, whenever the pre-dose is close to the standard one, especially in terms of volume, it is clear that a mere extraneous oscillation will release the end of weighing signal, though the conveying of the additional dose is not yet started, and that the final dose which should be equal to the standard dose has not yet been reached.

The object of the invention is to overcome these inconveniences and relates, to this end, to a process allowing an accurate delivery of doses conveyed in two quick cycles. The first cycle serves for the preparation of a pre-dose. The second serves for the conveying of an additional dose, so that the cumulated values of the two doses will be equivalent to the standard fixed dose; the process is characterized, on the one hand, by the locking of the balance beam during a part of the time required for the conveying of the pre-dose, and, on the other hand, by a temporary cutting-down of this period of time along a given value, said cutting-down being made at the latest before the beginning of the conveying of the additionnal dose. This allows the damping of extraneous thrusts at the end of the weighing. Such thrusts occur as a result of pre-doses maintained within reasonable limits but still close to the standard dose.

According to a feature of the invention, the beam of the balance is unlocked after the beginning of the conveying of the additionnal dose.

According to another feature, a ballast is withdrawn from the beam after the beginning of the conveying of the additionnal dose.

Besides, the next pre-dose is adjusted in diminution, at the time when the last signal indicating the end of the weighing appears within proper limits, which take place before and after the time at which the ballast is withdrawn.

Finally, according to the invention, the time limit within which the adjustment is made cutting-down the next pre-dose, takes place before and after the time at which starts the conveying of the additional dose.

The invention also relates to a device for the carrying into effect of the above described process or a similar process.

According to a process in accordance with the invention, the taring device comprises a ballast, having preferably the shape of a ring, hooked on a shaft placed close to the beam of the weighing unit. The shaft is connected to control means worked by a programming system, so as to be driven in oscillating motion, thereby allowing the ballast to be laid on the beam during a given time, and then removed according to the weighing program chosen.

According to this process, the ring is hung above the beam of the weighing unit, in hooks secured to the rotatable shaft.

The invention relates finally to an installation for the packing of doses of tobacco equipped with a weighing unit including a taring device similar to the one above described.

A device according to the invention is shown , as a non restrictive example, on the attached drawings wherein:

FIG. 2 is a perspective view of the taring device according to the invention,

FIG. 3 is a view taken along line A–B in FIG. 2,

One of the specific objects of the invention lies in a process allowing to obtain predetermined doses of tobacco the weight of which is as constant as possible.

Another object of the invention is to avoid that an extraneous oscillation will erroneously release the end of weighing signal.

This point is important because the duration of the conveying of the additional dose is used as entry information for the adjustment of the next pre-dose.

According to the invention, the pre-dose is cut down at the beginning of the cycle by a small predetermined quantity. This is accomplished by acting on the weighing unit with a ballast during a short while. Thereby, the risk of extraneous oscillations is noticeably reduced. The cutting-down of the delivery, resulting in the cutting-down of the next pre-dose, can thus be made only if the pre-dose of the cycle is close to the value of the pre-dose close to the fixed standard weight increased by the value value the ballast.

Figure 1:
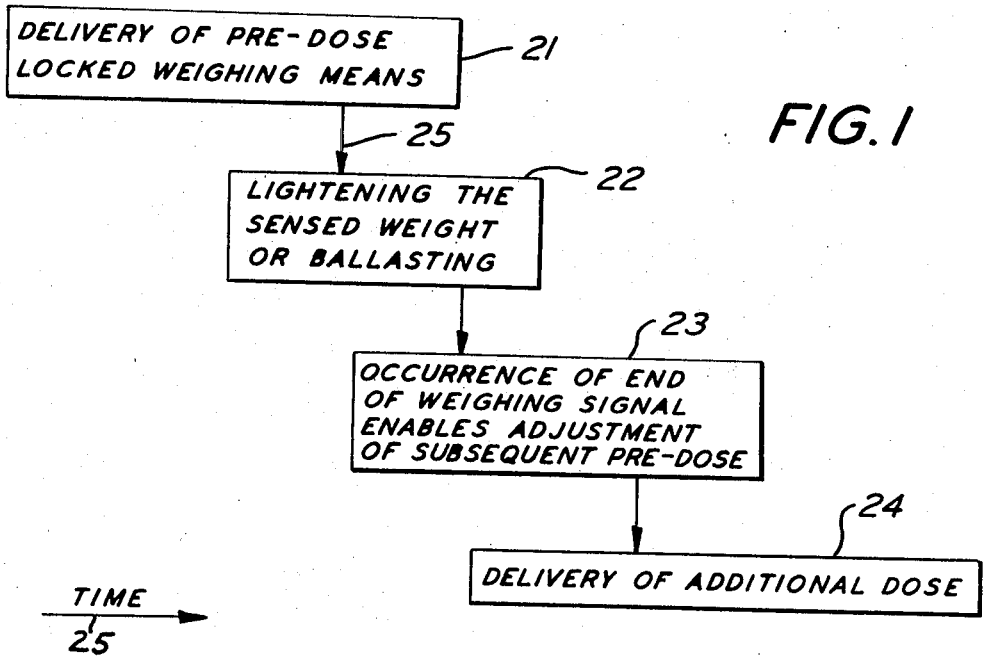
FIG. 1 is a flow diagram according to the present invention.

FIG. 1 is a flow diagram according to the invention. Delivery of an initial or pre-dose under a locked weighing means condition is shown by block 21. Block 21 corresponds to time period E-F of FIG. 4. Time is shown as progressing in the direction of arrow 25. Lightening of the sensed weight or ballasting is shown by block 22 and corresponds to time period G-H in FIG. 4. The occurrence of the last end of weighing signal within the time period of block 23, or in other words the time period I-J of FIG. 4, enables adjustment of the next pre-dose. The delivery of an additional dose is shown by block 24 which corresponds to time period K-L of FIG. 4. The delivery of the pre-dose and additional dose constitutes a final dose which is equal to a desired predetermined dose.

The ballast device according to the invention, shown on FIG. 2, includes a shaft 1 fitted with two hooks 2a and 2b secured to shaft 1, as well as a crank shaft 3.

Shaft 1 is fitted loosely into two bores 4a and 4b two straps 5a and 5b forming one piece with frame 6.

Crank shaft 3 is secured by a hinge 7 to the piston 8 of a jack 9, which jack is also fitted on frame 6. The jack is actuated, for instance, by an electrically driven valve 10 controlled by a memorized servo-mechanism 11 which works the whole device.

The ballast piece is made of a ring 12 supported by hooks 2a and 2b.

Said ring 12 can be nested in a groove 13 in the beam 14 of the weighing unit.

FIG. 3 shows a cross-section of the taring device as well as ring 12 nested into groove 13 of the weighing unit beam 14. In the position shown, hooks 2b and 2a do not hold ring 12.

According to another feature of the invention, and in order to overcome an objection to conventional installations, the weighing device is left operative during the whole time required for the weighing of the additional dose, the locking and the emptying of said device being made periodically at the end of each cycle and no longer from the end of weighing signal. This signal is limited to the end of the conveying of the additional dose. Conveying may start again during the weighing cycle whenever, after an oscillation, the end of weighing signal disappears.

This means that during the cycle corresponding to the forming of the pre-dose, volumetric or other, the weighing device remains locked. During the cycle corresponding to the delivery of the additional dose, the weighing device is unlocked and the delivery of said additional dose is stopped momentarily only when an oscillation releases the end of weighing signal. The delivery may continue if the end of weighing signal disappears, and so on until the final end of weighing signal is reached. In any case, the delivery of the dose so formed will only start at the cyclic signal.

Thus, the full dose closely conforms to the predetermined weight.

The duration of the delivery of the additional dose is increased, thus allowing synchronism of the reading device with the final end of weighing signal. As a result, the total a dose is weighed with accuracy.

Figure 4:
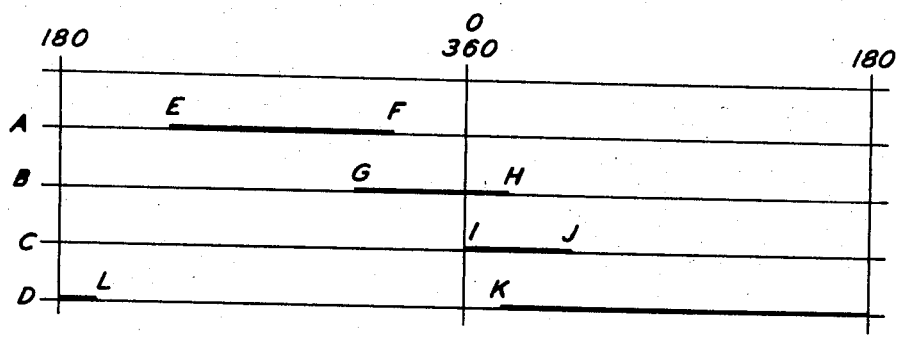
FIG. 4 is a circular diagram showing the cycle of a weighing operation.

FIG. 4 is a diagram showing, as an example, a process in accordance with the invention.

This circular diagram includes four horizontal parameters parallel corresponding respectively to:
the duration required for the locking of the beam,
the duration required for the applying of the ballast,
the limits within which the cutting-down adjustment of the next pre-dose varies,
the duration required for the conveying of the additional dose.

Depending on the method followed, referring to this diagram, and in assuming for instance that the examination is made at the time of the conveying of a pre-dose (which is made during the conveying of the additional dose of the final preceding dose), the beam of the balance is locked during the conveying of said pre-dose (line A) and, by means of a ballast, the weight of this pre-dose is cut down before the unlocking of the beam as shown on line B. This cutting down serves to increase the difference extant between the predetermined weight and the weight of the pre-dose before the latter will have the time to impress extraneous oscillations to the beam of the balance.

This temporary cutting down of the pre-dose is stopped at the latest after the conveying of the additional dose is started (see lines B and D).

The adjustment of the next pre-dose will be accordingly cut down if the last end of weighing signal is situated within the limits set, for instance between I and J (line C).

Naturally, this last end of weighing signal occurs only when the oscillations, resulting particularly from the conveying of the additional dose, become null and that, as a consequence, the final dose is absolutely equal to the predetermined dose.

Besides, the information to convey on the adjustment of the next pre-dose shall be processed by a memorized circuit taking into account the time at which occurs the last end of weighing signal in the cycle. It should be noted that the locking of the weighing signal in the the emptying thereof being, according to this method, a cyclic operation, the connection between this device and the buckets of the packing machine can be made directly by suppressing the valve which is normally fitted at the low part of the feeding spout located under the weighing units and above the bucket chain.

The invention, of course, is not restricted to the designing examples hereinabove described and shown, for which modifications and changes may be made without departing from the spirit of the invention, and all of such changes are contemplated as coming within the scope of the claims.

What I claim is:

1. A process for regulating the weight of doses of material delivered from bulk in two successive time cycles, comprising the steps of delivering an initial dose weighing less than a desired predetermined total dose during one time cycle, delivering a topping-up dose as an addition to the initial dose during the other time cycle, generating a signal when the sensed combined weight of the initial and topping-up doses reach the predetermined total dose, temporarily lightening the sensed weight of the initial dose during a time period comprising part of the one cycle and extending into part of the other cycle, sensing the time at which said signal occurs, and reducing the weight of a succeeding initial dose if said signal occurs during a time period beginning at the inception of said other cycle and continuing for a fraction of said other cycle greater than the part of said other cycle during which the sensed weight of the initial dose is temporarily lightened but substantially less than the entire other cycle.

2. A process in accordance with claim 1 wherein said last-mentioned time period is set to continue for less than a major portion of said other cycle.

3. A process in accordance with claim 1 wherein delivery of the topping-up dose is halted upon generation of said signal, and the step of resuming delivery of said topping-up dose if said signal disappears during said other time cycle, generating a new signal when the sensed combined weight of the initial and topping-up doses again reach the predetermined total dose, and halting delivery of the topping-up dose upon generation of the new signal.

4. A process in accordance with claim 1 wherein the doses are delivered to a weighing apparatus, the weighing apparatus being locked to prevent oscillation thereof during at least part of the delivery time of the initial dose, and unlocked between the start of said step of temporarily lightening the sensed weight of the initial dose and the end of said one time cycle.

5. A process in accordance with claim 1, wherein delivery of the topping-up dose begins when temporary lightening of the sensed weight of the initial dose ends.

6. A process in accordance with claim 5 wherein delivery of the topping-up dose is halted upon generation of said signal, and the step of resuming delivery of said topping-up dose if said signal disappears during said other time cycle, generating a new signal when the sensed combined weight of the initial and topping-up doses again reach the predetermined total dose, and halting delivery of the topping-up dose upon generation of the new signal.

* * * * *